United States Patent
Gosselink et al.

[11] Patent Number: 6,133,186
[45] Date of Patent: Oct. 17, 2000

[54] PROCESS FOR THE PREPARATION OF A CATALYST COMPOSITION

[75] Inventors: Johan Willem Gosselink; Johannes Anthonius Robert Van Veen, both of Amsterdam, Netherlands

[73] Assignee: Shell Oil Company, Houston, Tex.

[21] Appl. No.: 09/030,456

[22] Filed: Feb. 25, 1998

[30] Foreign Application Priority Data

Mar. 6, 1997 [EP] European Pat. Off. .............. 97200676

[51] Int. Cl.⁷ .............................. B01J 29/05; C10J 47/02; C10J 47/12
[52] U.S. Cl. ......................... 502/67; 502/68; 208/111.01; 208/104; 208/112
[58] Field of Search ..................................... 208/111, 106, 208/109, 112, 118, 111.01, 107, 104; 502/67, 68, 78, 79

[56] References Cited

U.S. PATENT DOCUMENTS

| | | | |
|---|---|---|---|
| 4,503,023 | 3/1985 | Breck et al. ............................. | 423/328 |
| 4,711,770 | 12/1987 | Skeels et al. ............................ | 423/328 |
| 4,757,041 | 7/1988 | Oleck et al. ............................. | 502/65 |
| 4,837,396 | 6/1989 | Herbst et al. ............................ | 502/67 |
| 5,279,726 | 1/1994 | Ward ..................................... | 208/111 |
| 5,350,501 | 9/1994 | Ward ..................................... | 208/111 |
| 5,413,977 | 5/1995 | Occelli .................................... | 502/68 |

FOREIGN PATENT DOCUMENTS

| | | |
|---|---|---|
| 0140608 | 8/1985 | European Pat. Off. . |
| 0247678 | 2/1987 | European Pat. Off. . |
| 0247679 | 2/1987 | European Pat. Off. . |
| 0559646 | 10/1994 | European Pat. Off. . |
| WO 91/17829 | 11/1991 | WIPO . |
| WO 93/02159 | 2/1993 | WIPO . |
| WO 94/26847 | 11/1994 | WIPO . |
| WO 95/02653 | 1/1995 | WIPO . |
| WO 97/20016 | 6/1997 | WIPO . |

OTHER PUBLICATIONS

"Progress in Zeolite and Microporous Materials," *Studies in Surface Science and Catalysis*, vol. 105, pp. 341–348, by Camblor et al., Elsevier Science B.V. (1997).

*Primary Examiner*—Walter D. Griffin
*Assistant Examiner*—Thuan D. Dang

[57] ABSTRACT

The present invention provides a process for the preparation of a catalyst composition which comprises, as first cracking component, a zeolite beta with a silica to alumina molar ratio of at least 20 comprising crystals less than 100 nm in size, and a second cracking component selected from (i) crystalline molecular sieves having pores with diameters greater than 0.6 nm, and (ii) clays, the process comprising the steps of:

(i) preparing a mixture comprising the first cracking component and the second cracking component, the first cracking component being in the form of a sol, (ii) extruding the mixture into catalyst extrudates, and (iii) calcining the extrudates.

15 Claims, No Drawings

PROCESS FOR THE PREPARATION OF A CATALYST COMPOSITION

The present invention relates to a process for the preparation of a catalyst composition.

Of the many conversion processes known in the refining art, hydrocracking has assumed a greater importance over the years since it offers the refiner product flexibility combined with product quality.

There has been considerable effort devoted to the development of hydrocracking catalysts which combine high cracking activity with a low tendency to overcrack towards light products and, in particular, less valuable $C_1$–$C_3$ gaseous by-products.

Kerosine or gas oil (middle distillates) are often the desired products of a hydrocracking process. However, hydrocracking catalysts with a high selectivity towards middle distillates tend to have a low cracking activity. Such catalysts are typically based on a single, active cracking component such as an aluminosilicate, especially a Y zeolite component.

It is known, e.g. from U.S. Pat. No. 5,279,726 and EP-B-559 646 to form composites of two different aluminosilicates, a Y zeolite and zeolite beta, for use in hydrocracking.

More specifically, in U.S. Pat. No. 5,279,726 a hydrocracking catalyst is disclosed having high activity and selectivity for gasoline which comprises a hydrogenation component on a catalyst support comprising both zeolite beta and a Y zeolite having a unit cell size above 2,440 nm (24.40 Ångstroms), the zeolites usually and preferably being in further combination with a porous, inorganic refractory oxide such as alumina.

The zeolite beta used in the catalyst support has a silica to alumina molar ratio of at least 10 up to 100, but preferably no more than 40 and most preferably in the range of 20 to 30. Preferably, the zeolite beta has a crystal size of 0.1 to 0.7 micron (100 to 700 nm), a surface area of 500 to 800 $m^2/g$ and a cyclohexane adsorption capacity of 15 to 25 g/100 g.

The Y zeolite used in the catalyst support preferably has a unit cell size between 2.445 and 2.464 nm (24.45 and 24.64 Ångstroms) and, typically, a sorptive capacity for water vapour at 25° C. and a $p/p_o$ value of 0.1 of at least 15% w (per cent by weight), as exemplified by LZY-82 and LZY-84 zeolites.

U.S. Pat. No. 5,279,726 contains a single example which details the preparation and testing of four hydrocracking catalysts numbered one (1), two (2), three (3) and four (4). All of the catalysts contained the same amount and type of hydrogenation components but differed in their catalyst supports. Catalyst 1 contained a catalyst support of 80% w zeolite beta (silica to alumina molar ratio 26) and 20% w alumina; Catalyst 2 contained a catalyst support of 40% w zeolite beta (silica to alumina molar ratio 26), 40% w LZ-10 zeolite (silica to alumina molar ratio 5.2; unit cell size 2.430 nm) and 20% w alumina; Catalyst 3 contained a catalyst support of 40% w zeolite beta (silica to alumina molar ratio 26), 40% w LZY-82 zeolite (silica to alumina molar ratio 5.7; unit cell size 2.455 nm) and 20% w alumina; and Catalyst 4 contained a catalyst support of 80% w LZY-82 zeolite (silica to alumina molar ratio 5.7; unit cell size 2.455 nm) and 20% w alumina. Catalysts 1, 2 and 4 were comparative catalysts whilst Catalyst 3 was a catalyst according to the invention.

When the hydrocracking performances of the catalysts were assessed under second stage series-flow conditions (referred to in U.S. Pat. No. 5,279,726 as first stage simulation under ammonia-rich conditions), the results in Table II, Column 14 show that Catalyst 3 of the invention yielded more gasoline than comparative Catalyst 4 (a commercial gasoline hydrocracking catalyst) with some slight reduction in the amount of $C_1$–$C_3$ gaseous by-product.

Similarly, EP-B-559 646 discloses a hydrocracking catalyst having high activity and selectivity for gasoline which comprises a hydrogenation component on a catalyst support comprising both zeolite beta and a dealuminated Y zeolite having an overall silica to alumina molar ratio greater than 6.0. The support may further contain a porous, inorganic refractory oxide such as alumina or silica-alumina.

The zeolite beta used in the catalyst support has a silica to alumina molar ratio of at least 10 up to 100, but preferably no more than about 40 and most preferably in the range of 20 to 30. Preferably, the zeolite beta has a crystal size of 0.1 to 0.7 micron (100 to 700 nm), a surface area of 500 to 800 $m^2/g$ and a cyclohexane adsorption capacity of 15 to 25 g/100 g.

The dealuminated Y zeolite used in the catalyst support preferably has an overall silica to alumina molar ratio between 6.1 and 20.0, and most preferably between 8.0 and 15.0. The unit cell size for the dealuminated Y zeolite is normally between 2.440 and 2.465 nm (24.40 and 24.65 Ångstroms). The preferred dealuminated Y zeolites to use are the LZ-210 zeolites as described in U.S. Pat. Nos. 4,503,023 and 4,711,770.

There is a single example in EP-B-559 646 which details the preparation and testing of four hydrocracking catalysts numbered one (1), two (2), three (3) and four (4). All of the catalysts contained the same amount and type of hydrogenation components but differed in their catalyst supports. Catalyst 1 contained a catalyst support of 80% w zeolite beta (silica to alumina molar ratio 26) and 20% w alumina; Catalyst 2 contained a catalyst support of 30% w zeolite beta (silica to alumina molar ratio 26), 50% w LZ-210 zeolite (silica to alumina molar ratio 12; unit cell size 2.441 nm) and 20% w alumina; Catalyst 3 contained a catalyst support of 30% w zeolite beta (silica to alumina molar ratio 26), 50% w LZ-10 zeolite (silica to alumina molar ratio 5.2; unit cell size 2.430 nm) and 20% w alumina; and Catalyst 4 contained a catalyst support of 80% w LZY-82 zeolite (silica to alumina molar ratio 5.7; unit cell size 2.455 nm) and 20% w alumina. Catalysts 1, 3 and 4 were comparative catalysts whilst Catalyst 2 was a catalyst according to the invention.

When the hydrocracking performances of the catalysts were assessed under second state series-flow conditions (referred to in EP-B-559 646 as first stage simulation under ammonia-rich conditions), the results in Table 3 show that whilst Catalyst 2 of the invention produced the highest yield of gasoline of the catalysts tested, it also produced a significant amount of undesired $C_1$–$C_3$ gaseous by-product. Indeed, Catalyst 2 produced more gaseous by-product (i.e. had a higher gas make) than comparative Catalyst 4 (a commercial gasoline hydrocracking catalyst) which is known to yield high gas makes.

In WO 94/26847 a process is disclosed for simultaneously hydrocracking, hydroesulphurizing and hydrodenitrogenating a hydrocarbonaceous feed by contacting a feedstock which contains sulphur compounds and nitrogen compounds, has a boiling range of more than 80% v boiling above 300° C., and has not been subjected to any preparatory catalytic hydrodesulphurization or hydrodenitrogenation, at elevated temperature and pressure, in the presence of hydrogen, with a catalyst containing a carrier such as alumina or silica-alumina, a Group VIB metal component, a Group VIII metal component, and an inorganic, crystalline, non-layered aluminosilicate with pores of diameter greater than 1.3 nm and exhibiting, after calcination, an X-ray diffraction pattern with at least one peak at a d-spacing greater than 1.8 nm, such as an aluminosilicate as described in WO 93/02159, in particular the aluminosilicate designated MCM-41.

Although it is indicated in Page 7, lines 15 to 19 of WO 94/26847 that other molecular sieves may be incorporated into the catalyst in addition to the aluminosilicate, such as Y zeolites, ultrastable Y zeolites having a unit cell size ($a_o$) of from 2.425 to 2.440 nm (24.25 to 24.40 Ångstroms), zeolite beta, mordenite, and materials of the ZSM-5 type having a silica to alumina ratio in the range of 12 to 300, there are no examples in WO 94/26847 of the preparation and testing of any such composite catalysts, nor any suggestion to use a specific zeolite beta for this purpose.

It is also known from WO 91/17829 to hydrocrack feedstocks using a catalyst which comprises a hydrogenation component and a support comprising zeolite beta and a Y zeolite having either (i) a unit cell size below 2.445 nm (24.45 Ångstroms) or (ii) a water vapour sorptive capacity at 25° C. and a $p/p_o$ value of 0.10 of less than 10.00% w, the zeolites usually and preferably being in further combination with a porous, inorganic refractory oxide such as aluminia.

The zeolite beta present in the catalyst support has a silica to alumina molar ratio of at least 10 up to 100, but preferably no more than 40 and most preferably in the range of 20 to 30. Preferably the zeolite beta has a crystal size of 0.1 to 0.7 micron (100 to 700 nm), a surface area of 500 to 800 $m^2/g$ and a cyclohexane adsorption capacity of 15 to 25 g/100 g.

Preferred Y zeolites to use are those meeting both of the above requirements (i) and (ii), for example, ultrahydrophobic Y (UHP-Y) zeolites as exemplified by LZ-10 zeolite.

The hydrocracking catalyst according to WO 91/17829 may, depending on the process conditions selected, be used for gasoline or middle distillates production. However, the catalyst is apparently better suited for gasoline production.

U.S. Pat. No. 5,413,977 discloses a hydrocracking catalyst having high activity and selectivity for gasoline which comprises a hydrogenation component on a catalyst support comprising zeolite beta and a layered magnesium silicate including hectorite and saponite (which are both smectite minerals) and, especially, sepiolite.

The zeolite beta used in the catalyst support has a silica to alumina molar ratio of at least 10 up to 100, but preferably no more than 40 and most preferably in the range of 20 to 30. Preferably the zeolite beta has a crystal size of 0.1 to 0.7 micron (100 to 700 nm), a surface area of 400 to 800 $m^2/g$, a cyclohexane adsorption capacity of 15 to 25 g/100 g, and a water vapour sorptive capacity at 25° C. and a $p/p_o$ value of 0.10 of greater than 5% w.

WO 97/20016 discloses a stable hydrocracking catalyst having high activity combined with good middle distillate selectivity which comprises, as first cracking component, a zeolite beta having a silica to alumina molar ratio of at least 20 which is in the form of crystals less than 100 nm in size; a second cracking component selected from (i) crystalline molecular sieves having pores with diameters greater than 0.6 nm, (ii) crystalline mesoporous aluminosilicates having pores with diameters of at least 1.3 nm, and (iii) clays; and at least one hydrogenation component.

It has been observed when preparing the catalyst of Internation Patent Application No. PCT/EP96/05352 that some agglomeration of the zeolite beta crystals into larger crystals may occur. It would be desirable if this agglomeration could be avoided as the cataylst would then have an even higher activity.

The present invention therefore seeks to overcome this problem.

In accordance with the present invention, there is provided a process for the preparation of a catalyst composition which comprises, as first cracking component, a zeolite beta with a silica to alumina molar ratio of at least 20 comprising crystals less than 100 nm in size, and a second cracking component selected from (i) crystalline molecular sieves having pores with diameters greater than 0.6 nm, and (ii) clays, the process comprising the steps of:

(i) preparing a mixture comprising the first cracking component and the second cracking component, the first cracking component being in the form of a sol, (ii) extruding the mixture into catalyst extrudates, and (iii) calcining the extrudates.

In the present specification, unless otherwise indicated, the silica to alumina molar ratio of a zeolite is the molar ratio as determined on the basis of the total or overall amount of aluminum and silicon (framework and non-framework) present in the zeolite.

In step (i) of the present process, zeolite beta (the first cracking component), which is in the form of a sol (i.e. a suspension of zeolite beta crystals of colloidal size in a liquid), is combined with the second cracking component to form a mixture. The zeolite beta has a silica to alumina molar ratio of at least 20, preferably at least 25. Zeolite beta with a higher silica to alumina molar ratio, e.g. up to, and including 60, 80, 100, 120 or 150, may also be used if desired. Thus, the zeolite beta may have a silica to alumina molar ratio in the range of from 20 to 60, 25 to 60, 20 to 80, 25 to 80, 20 to 100, 25 to 100, 20 to 120, 25 to 120, 20 to 150 or 25 to 150. The zeolite beta crystals in the sol are less than 100 nm in size, e.g. up to 99 nm in size. Preferably, the crystals are in the range of from 20 to 95 nm in size, more preferably from 30 to 75 nm in size, still more preferably from 40 to 75 nm size and particularly from 50 to 70 nm in size.

The zeolite beta sol may conveniently be prepared by the method of Camblor et al., "Progress in Zeolite and Microporous Materials", Vol. 105, pp. 341–348, Elsevier (1997).

Without wishing to be bound to any particular theory, the zeolite beta sol used in the process of the present invention surprisingly appears to provide a better dispersion of zeolite beta crystals, thereby reducing the risk that the zeolite beta crystals will agglomerate in the catalyst composition.

The second cracking component which is combined with the zeolite beta sol is selected from (i) crystalline molecular sieves having pores with diameters greater than 0.6 nm (e.g. as determined by nitrogen adsorption techniques), and (ii) clays.

In the context of the present specification, the term "molecular sieve" also includes the corresponding (hydrothermally) stabilised and dealuminated derivatives and such derivatives as may be obtained by isomorphous substitution and cation exchange. Methods for the cation exchange, (hydrothermal) stabilisation, dealumination and isomorphous substitution of molecular sieves are well known in the art and are not therefore further discussed in the present specification.

The second cracking component may be a single material (i) or (ii), or a combination of two or more such materials.

Preferably, the second cracking component is selected from (i) crystalline molecular sieves of structure type FAU, EMT, MOR, LTL, MAZ, MTW, OFF, BOG, AET, AFI, AFO, AFR, AFS, AFY, ATS, VFI and CLO as described in "Atlast of Zeolite Structure Types", 3rd Edition, published in 1992 on behalf of the Structure Commission of the International Zeolite Association; and (ii) clays of the non-pillared smectite type, e.g. montmorillonites, hectorites, saponites and beiddelites.

Most preferably, the second cracking component is (i) a crystalline molecular sieve of structure type FAU, e.g. a very ultrastable zeolite Y (VUSY) of unit cell size ($a_o$) less than 2.440 nm (24.40 Ångstroms), in particular less than 2.435 nm (24.35 Ångstroms) as are known, for example, from EP-A-247 678 and EP-A-247 679.

The VUSY zeolite of EP-A-247 678 or EP-A-247 679 is characterised by a unit cell size below 2.445 nm (24.45 Ångstroms) or 2.435 nm (24.35 Ångstroms), a water adsorption capacity (at 25° C. and a $p/p_o$ value of 0.2) of at least 8% w of the zeolite and a pore volume of at least 0.25 ml/g wherein between 10% and 60% of the total pore volume is made up of pores having a diameter of at least 8 nm.

In addition to the first and second cracking components, the mixture may further comprise a binder, in particular an inorganic oxide binder. Examples of suitable binders include alumina, silica, aluminium phosphate, magnesia, titania, zirconia, silica-alumina, silica-zirconia, silica-boria and combinations thereof. Alumina is the most preferred binder.

Step (i) of the present process may conveniently be carried out by mulling the zeolite beta sol and the second cracking component, optionally together with binder, in the presence of water and a peptising agent, e.g. acetic acid or nitric acid, to form a mixture which is subsequently extruded into catalyst extrudates in step (ii) and the catalyst extrudates calcined in step (iii).

The zeolite beta sol, second cracking component and binder are combined in amounts such that the eventual calcined catalyst extrudates comprise preferably in the range of from 0.5 to 40% w zeolite beta (first cracking component), in the range of from 0.5 to 90% w second cracking component and in the range of from 0 to 99% w binder; more preferably from 1 to 15% w, particularly from 5 to 10% w, zeolite beta, from 5 to 80% w, particularly from 40 to 60% w, second cracking component, and the remainder being binder, all percentages by weight (% w) being calculated on the basis of the combined dry weight of the first cracking component, second cracking component and binder.

Step (ii) of the present process may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length. If desired, the catalyst extrudates may be dried, e.g. at a temperature from 100 to 300° C. for a period of 30 minutes to 3 hours, prior to calcination in step (iii). Calcination is conveniently carried out in air at a temperature in the range of from 300 to 800° C. for a period from 30 minutes to 4 hours.

The catalyst composition prepared by the process of the present invention will usually further comprise at least one hydrogenation component. Examples of hydrogenation components that may suitably be used include Group VI components (such as molybdenum and tungsten) and Group VIII components (such as cobalt, nickel, iridium, platinum and palladium). Preferably, at least two hydrogenation components are used, e.g. a molybdenum and/or tungsten component in combination with a cobalt and/or nickel component or platinum in combination with palladium. Particularly preferred combinations are nickel/tungsten, nickel/molybdenum, and platinum/palladium.

The at least one hydrogenation component may be incorporated at various stages during the preparation of the catalyst composition, according to techniques conventional in the art. For example, the at least one hydrogenation component may be loaded onto one or both of the cracking components by means of cation exchange or pore volume impregnation before the cracking components are combined in step (i) of the present process. Alternatively, the at least one hydrogenation component may be added in step (i) and/or may be added to the calcined extrudates of step (iii) in a further step (iv), typically as one or more aqueous (impregnating) solutions of Group VI and/or Group VIII metal salts.

In a preferred aspect of the present invention, the at least one hydrogenation component is added during step (iv) only. Thus, the present invention further provides a process for the preparation of a catalyst composition which comprises, as first cracking component, a zeolite beta with a silica to alumina molar ratio of at least 20 comprising crystals less than 100 nm in size; a second cracking component selected from (i) crystalline molecular sieves having pores with diameters greater than 0.6 nm, and (ii) clays; and at least one hydrogenation component, the process comprising the steps of:

(i) preparing a mixture comprising the first cracking component and the second cracking component, the first cracking component being in the form of a sol, (ii) extruding the mixture into catalyst extrudates, (iii) calcining the extrudates, and (iv) adding the at least one hydrogenation component to the calcined extrudates.

In another preferred aspect of the invention, step (iv) is followed by a further step (v) in which the extrudates are again calcined as hereinbefore described.

The catalyst composition may contain up to, and including 50 parts by weight of hydrogenation component, calculated as metal per 100 parts by weight of total, dry catalyst composition. For example, the catalyst composition may contain in the range of from 2 to 40, more preferably from 5 to 30 and especially from 10 to 20, parts by weight of Group VI metal(s) and/or in the range of from 0.05 to 10, moe preferably from 0.5 to 8 and advantageously from 1 to 6, parts by weight of Group VIII metal(s), calculated as metal per 100 parts by weight of total, dry catalyst composition.

Such a catalyst composition containing a hydrogenation component may advantageously be used in a process for converting a hydrocarbonaceous feedstock into lower boiling materials which comprises contacting the feedstock with hydrogen at elevated temperature and elevated pressure in the presence of the catalyst composition (a hydrocracking process).

Hydrocarbonaceous feedstocks that may be converted by the above process include atmopsheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be used. The feedstock may comprise hydrocarbons having an initial boiling point of from at least 330° C. down to at least 50° C. The boiling range (from initial to final boiling point) may be in the range of from about 50 to 800° C., with preference being given to feedstocks having a boiling range of from about 60 to 700° C. The feedstock may have an nitrogen content of up to 5000 ppmw (parts per million by weight) and a sulphur content of up to 6% w. Typically, nitrogen contents are in the range from 250 to 2000 ppmw and sulphur contents are in the range from 0.2 to 5% w. However, the feedstock may normally have a lower nitrogen and/or sulphur content, furthermore it is possible and may sometimes be desirable to subject part or all of the feedstock to a pre-treatment, for example, hydroenitrogenation, hydrodesulphurization or hydrodemetallization, methods for which are known in the art, such that the feedstock subjected to hydrocracking has a much lower nitrogen, sulphur and/or metal content.

The hydrocracking process may be carried out at a reaction temperature in the range of from 200 to 500° C., conveniently from 250 to 500° C., preferably in the range from 300 to 450° C.

The process is preferably carried out at a total pressure (at the reactor inlet) in the range from $3 \times 10^6$ to $3 \times 10^7$ Pa (30 to 300 bar), more preferably from $4 \times 10^6$ to $2.5 \times 10^7$ Pa (40 to 250 bar), e.g. from $8 \times 10^6$ to $2 \times 10^7$ Pa (80 to 200 bar).

The hydrogen partial pressure (at the reactor inlet) is preferably in the range from $3 \times 10^6$ to $2.9 \times 10^7$ Pa (30 to 290 bar), more preferably from $4 \times 10^6$ to $2.4 \times 10^7$ Pa (40 to 240 bar) and still more preferably from $8 \times 10^6$ to $1.9 \times 10^7$ Pa (80 to 190 bar).

A space velocity in the range from 0.1 to 10 kg feedstock per liter catalyst per hour ($kg.l^{-1}.h^{-1}$) is conveniently used. Preferably the space vocicity is in the range of from 0.1 to 8, particularly from 0.2 to 5 $kg.l^{-1}.h^{-1}$.

The ratio of hydrogen gas to feedstock (total gas rate) used in the process will generally be in the range from 100 to 5000 Nl/kg, but is preferably in the range from 200 to 3000 Nl/kg.

The present invention will be further understood from the following illustrative examples in which the silica to alumina molar ratio of an aluminosilicate (zeolite) was determined on the basis of the total amount of aluminum and silicon (framework and non-framework) present in the zeolite and the unit cell size ($a_o$) of an aluminosilicate (zeolite) was determined according to standard test method ASTM D 3942-80. Furthermore, the boiling points and density of the hydrocarbonaceous feedstocks were determined according to standard test methods ASTM D 86 and D 1298 respectively.

EXAMPLE 1

(i) Preparation of a Zeolite Beta Sol

A zeolite beta sol was prepared by the method of Camblor et al., "Progress in Zeolite and Microporous Materials", Vol. 105, pp. 341–348, Elsevier (1997), as follows.

To an aqueous solution of tetraethylammonium hydroxide (TEAH) free of alkali metal ions (225 g, 40% w solution, ex-aAlfa) was added aluminum metal (2.93 g) and the solution was heated at 50° C. for 5 hours to effect total dissolution of the aluminum metal. Once all the aluminium had dissolved the solution was added, with stirring, to a mixture made by dispersing 'Aerosil 200' (trade mark) amorphous silica (162.5 g, ex-Degussa) in an aqueous solution of tetraethylammonium hydroxide (311.9 g TEAH, ex-Alfa, in 407 g water), which resulted in the formation of a gel (Si/Al atomic ratio of 25). After stirring for 15 minutes, the gel was transferred to an autoclave operated at 140° C. and 300 rpm for 240 hours. The contents of the autoclave were then quenched with cold water and the solids separated by centrifugation. Washing of the solids with distilled water until the pH of the wash water was less than pH 9 gave the desired product, a zeolite beta sol (Si/Al atomic ratio of 14; silica to alumina molar ratio of 28). X-ray diffraction and Transmission Electron Microscopy analyses carried out on the dried sol confirmed it to be pure zeolite beta with an average crystal size of 70 nm (700 Ångstroms).

(ii) Preparation of a Catalyst Composition a) A catalyst composition was prepared according to the process of the present invention by combining the zeolite beta sol prepared in (i) above (35.2 g, loss on ignition (LOI) of 71.6%) with alumina (53.8 g, LOI of 25.6%) and a very ultrastable zeolite Y (VUSY) according to EP-A-247 678 and EP-A-247 679 (58.4 g, LOI of 14.4%) having a silica to alumina molar ratio of 9.9 and a unit cell size ($a_o$) of 2.431 nm (24.31 Ångstroms). Water and acetic acid were added and the resulting mixture was mulled and then extruded, together with an extrusion aid, into pellets of cylindrical shape. The pellets were dried statically for 2 hours at 120° C. and then calcined for 2 hours at 530° C. The pellets so obtained had a circular end surface diameter of 1.6 mm and a water pore volume of 0.77 ml/g. The pellets comprised 10% w zeolite beta (first cracking component), 50% w VUSY zeolite (second cracking component and 40% w alumina (binder), on a dry weight basis.

b) 40.18 g of an aqueous solution of nickel nitrate (14.1% w nickel) and 39.93 g of an aqueous solution of ammonium metatungstate (67.26% w tungsten) were combined and the resulting mixture was diluted with water (34.6 g) and then homogenised. The pellets were impregnated with the homogenised mixture (69.7 ) ml), dried at ambient temperature (20° C.) for 4 hours and then at 120° C. for 2 hours and finally calcined for 2 hours at 500° C. The pellets contained 4% w nickel and 19% w tungsten (hydrogenation components), based on total composition.

Comparative Example A

The process of Example 1(ii) above was repeated except that a commercially available powdered zeolite beta (ex-PQ, silica to alumina molar ratio of 114 and crystal size in the range from 30 to 50 nm (300 to 500 Ångstroms)) was used instead of the zeolite beta sol to prepare a catalyst composition as described in Example 1 of International Patent Application No. PCT/EP96/05352.

EXAMPLE 2

The hydrocracking performance of the catalyst composition of Example 1 (hereinafter referred to as Catalyst 1) was assessed in a second stage series-flow simulation test. The testing was carried out in once-through microflow equipment which had been loaded with a top catalyst bed comprising 1 ml C-424 catalyst (commercially available from the Criterion Catalyst Company) diluted with 1 ml of 0.1 mm SiC particles and a bottom catalyst bed comprising 10 ml Catalyst 1 diluted with 10 ml of 0.1 mm SiC particles. Both catalyst beds were presulphided prior to testing.

The test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per liter catalyst per hour ($kg.l^{-1}.h^{-1}$), a hydrogen gas/heavy gas oil ratio of 1450 Nl/kg, a hydrogen sulphide partial pressure of $4.7 \times 10^5$ Pa (4.7 bar) and a total pressure of $14 \times 10^6$ Pa (140 bar).

| The heavy gas oil used had the following properties | |
|---|---|
| Carbon content | 86.69% w |
| Hydrogen content | 13.35% w |
| Nitrogen (N) content | 19 ppmw |
| Added n-Decylamine | 12.3 g/kg (equivalent to 1100 ppmw N) |
| Total nitrogen (N) content | 1119 ppmw |
| Density (15/4 C) | 0.8789 g/ml |
| Density (70/4 C) | 0.8447 g/ml |
| Molar weight | 433 g |
| Initial boiling point | 349° C. |
| 50% w boiling point | 461° C. |
| Final boiling point | 620° C. |
| Fraction boiling below 370° C. | 2.0% w |
| Fraction boiling above 540° C. | 13.3% w |

Hydrocracking performance was assessed at conversion levels between 45 and 100% w net conversion of feed components boiling above 370° C. The results obtained at 65% w net conversion of feed components boiling above 370° C. are shown in Table I below.

Comparative Example A'

The test procedure of Example 2 was repeated except that a bottom catalyst bed comprising 10 ml of the catalyst composition of Comparative Example A (hereinafter referred to as Catalyst A) diluted with 10 ml of 0.1 mm SiC particles was used. Hydrocracking performance was assessed at conversion levels between 45 and 100% w net conversion of feed components boiling above 370° C. The results obtained at 65% w net conversion of feed components boiling above 370° C. are presented in Table I below.

TABLE I

| | Catalyst System | |
|---|---|---|
| | C-424/Cat. A | C-424/Cat. 1 |
| Temp. (° C.) at 65% w net conversion | 371.5 | 368.5 |
| Product Selectivities (% w on feed) | | |
| Gas ($C_1$–$C_3$) | 0.8 | 0.9 |
| ($C_4$) | 2.7 | 3.1 |
| Naphtha ($C_5$ — 150° C.) | 34 | 34 |
| Kerosine (150–250° C.) | 36 | 37 |
| Gas Oil (250–370° C.) | 26.5 | 25 |
| Iso/Normal ratio of butanes | 2.4 | 2.7 |

It will be observed from Table I that whilst Catalyst 1 (prepared by the process of the present invention) and comparative Catalyst A both produced the same high yields of middle distillates with very little $C_1$–$C_3$ gaseous by-product, this was achieved at a lower temperature using Catalyst 1 (368.5° C.) than Catalyst A (371.5° C.). Thus, Catalyst 1 demonstrates increased activity without any loss in middle distillate selectivity relative to Catalyst A. Furthermore, whilst the iso/normal ratio for butanes only is quoted which is higher for Catalyst 1 than Catalyst A, a similar outcome would be expected for the other products. The higher the iso/normal ratio, the better the quality of the product.

EXAMPLE 3

Pellets comprising 10% w zeolite beta, 50% w VUSY zeolite and 40% w alumina were prepared following the procedure of Example 1 ii)a) above.

10.79 g of an aqueous solution of $Pt(NH_3)_4(NO_3)_2$ (2.99% w platinum) and 0.98 g of an aqueous solution of $Pd/NH_3)_4(NO_3)_2$ (6.56% w palladium) were combined and the resulting mixture was diluted with water to 24.9 ml and then homogenised. 31.84 g pellets were impregnated with the homogenised mixture, and then dried/calcined in air in a tube rotating at 10 rpm under the following heating regime: heating to 180° C. at 15° C. per minute; maintaining the temperature at 180° C. for 10 minutes; heating to 300° C. at 30° C. per minute; maintaining at 300° C. for 15 minutes.

The resulting pellets contained a metals loading of 1% w platinum and 0.2% w palladium (hydrogenation components) based on total composition.

EXAMPLE 4

The hydrocracking performance of the catalyst composition of Example 3 (hereinafter referred to a Catalyst 2) was assessed in a wax hydrocracking simulation test. The testing was carried out in once-through microflow equipment which had been loaded with a catalyst bed comprising 10 ml Catalyst 2 diluted with 10 ml of 0.1 mm SiC particles. The catalyst bed was reduced with hydrogen prior to testing.

The test involved the contact of a hydrocarbonaceous feedstock (a Fischer-Tropsch wax) with the catalyst bed in a once-through operation under the following process conditions: a space velocity of 1.15 kg wax per liter catalyst per hour (kg. $1^{-1}.h^{-1}$), a hydrogen gas/heavy gas oil ratio of 750 Nl/kg, and a total pressure of $4 \times 10^6$ Pa (40 bar).

| The heavy gas oil used had the following properties | |
|---|---|
| Carbon content | 85.35% w |
| Hydrogen content | 14.62% w |
| Sulphur (S) content | <10 ppmw |
| Density (125/4 C) | 0.7437 g/ml |
| Kinetic viscosity (@ 100° C.) | 3.9 mm²/s (3.9 cSt) |
| Initial boiling point | 65° C. |
| 50% w boiling point | 442° C. |
| Final boiling point | 700° C. |
| Fraction boiling below 370° C. | 20.6% w |
| Fraction boiling above 540° C. | 19.1% w |

Hydrocracking performance was assessed at conversion levels between 35 and 80% w net conversion of feed components boiling above 370° C. The results obtained at 60% w net conversion of feed components boiling above 370° C. are shown in Table II below.

TABLE II

| | Catalyst System Catalyst 2 |
|---|---|
| Temp. (° C.) at 65% w net conversion | 241 |
| Product Selectivities (% w on feed) | |
| Gas ($C_1$–$C_3$) | 0.5 |
| ($C_4$) | 2.1 |
| Naphtha ($C_5$ — 140° C.) | 19 |
| Kerosine (140–220° C.) | 24 |
| Gas Oil (220–370° C.) | 54 |
| Iso/Normal ratio of butanes | 3.6 |

It will be observed from Table II that Catalyst 2 (prepared by the process of the present invention) produced high yields of middle distillates with very little $C_1$–$C_3$ gaseous by-product, and a high iso/normal ratio for butanes.

We claim:

1. A process for the preparation of a catalyst composition which comprises, as first cracking component, a zeolite beta with a silica to alumina molar ratio of at least 20 comprising crystals less than 100 nm in size, and at least one second cracking component selected from (i) crystalline molecular sieves having pores with diameters greater than 0.6 nm, and/or (ii) clays, the process comprising the steps of:

(i) preparing a mixture comprising the first cracking component and the second cracking component, the first cracking component being in the form of a sol, (ii) extruding the mixture into catalyst extrudates, and (iii) calcining the extrudates.

2. The process of claim 1 wherein the mixture further comprises an inorganic oxide binder.

3. The process of claim 2 wherein the binder is selected from alumina, silica, aluminium phosphate, magnesia, titania, zirconia, silica-alumina, silica-zironia, silica-boria and combinations thereof.

4. The process of claim 1 which comprises the steps of:

(i) mulling the first and second cracking components, optionally together with binder, in the presence of water and a peptising agent to form a mixture, (ii) extruding the mixture into catalyst extrudates, and (iii) calcining the extrudates.

5. The process of claim 1 wherein the catalyst composition further comprises at least one hydrogenation component.

6. The process of claim 5 wherein the at least one hydrogenation component is added in step (i) and/or is added to the calcined extrudates of step (iii) in a further step (iv).

7. The process of claim 2 wherein the zeolite beta comprises crystals from 20 to 95 nm in size.

8. The process of claim 1 wherein the second cracking component is selected from (i) crystalline molecular sieves of structure type FAU, EMT, MOR, LTL, MAZ, MTW, OFF, BOG, AET, AFI, AFO, AFR, AFS, AFY, ATS, VFI and/or CLO; and/or (ii) clays of the non-pillared smectite type.

9. The process of claim 1 wherein the second cracking component is a crystalline molecular sieve having pores with diameters greater than 0.6 nm.

10. The process of claim 8 wherein the second cracking component is a crystalline molecular sieve of structure type FAU.

11. A catalyst composition produced by the process of claim 1.

12. A process for converting a hydrocarbonaceous feedstock into lower boiling materials, which comprises contacting the feedstock at elevated temperature in the presence of a catalyst composition of claim 11.

13. A process for converting a hydrocarbonaceous feedstock into lower boiling materials, which comprises contacting feedstock at elevated temperature in the presence of a catalyst composition produced by the process of claim 8.

14. A process for converting a hydrocarbonaceous feedstock into lower boiling materials, which comprises contacting feedstock at elevated temperature in the presence of a catalyst composition produced by the process of claim 9.

15. A process for converting a hydrocarbonaceous feedstock into lower boiling materials, which comprises contacting feedstock at elevated temperature in the presence of a catalyst composition produced by the process of claim 10.

* * * * *